United States Patent [19]

Likitanupak

[11] Patent Number: 4,566,853
[45] Date of Patent: Jan. 28, 1986

[54] WINDMILL

[76] Inventor: Chalerm Likitanupak, 16/25-26 Soi Watana (19), Sukhumvit Rd., Bangkok 11, Thailand

[21] Appl. No.: 507,431

[22] Filed: Jun. 23, 1983

[30] Foreign Application Priority Data

Jun. 25, 1982 [GB] United Kingdom ............... 8218529

[51] Int. Cl.⁴ .............................................. F03D 3/06
[52] U.S. Cl. ..................................... 416/117; 416/119
[58] Field of Search .............................. 416/117, 119

[56] References Cited

U.S. PATENT DOCUMENTS

| | | | |
|---|---|---|---|
| 193,954 | 8/1877 | Hodges | 416/117 |
| 197,457 | 11/1877 | Clark | 416/117 |
| 590,753 | 9/1897 | Flaig | 416/50 A |
| 833,593 | 10/1906 | Espinosa | 416/50 A |
| 1,162,912 | 12/1915 | Gulley | 416/50 A |
| 4,415,311 | 11/1983 | Grana et al. | 416/117 |

FOREIGN PATENT DOCUMENTS

| | | | |
|---|---|---|---|
| 3918 | 2/1879 | Fed. Rep. of Germany | 416/119 |
| 494018 | 8/1919 | France | 416/117 |
| 694511 | 12/1930 | France | 416/117 |
| 2040363 | 8/1980 | United Kingdom | 416/117 |

*Primary Examiner*—Everette A. Powell, Jr.
*Attorney, Agent, or Firm*—Townsend and Townsend

[57] ABSTRACT

A vertical axis windmill with a plurality of horizontal arms (16) mounted on an upright central axis (12) so as to rotate in a substantially horizontal plane. Each arm (16) has hinged at its free end a blade 18 which is downwardly depending. Each blade 18 being mounted at an angle of pitch to the respective end of the arm (16) of from 20° to 80° and also mounted at an angle of tilt to the end of the arm (16) of from 5° to 30°. Preferably, each blade (18) comprises one or more paddles (14) hinged to one or more frames (15).

8 Claims, 7 Drawing Figures

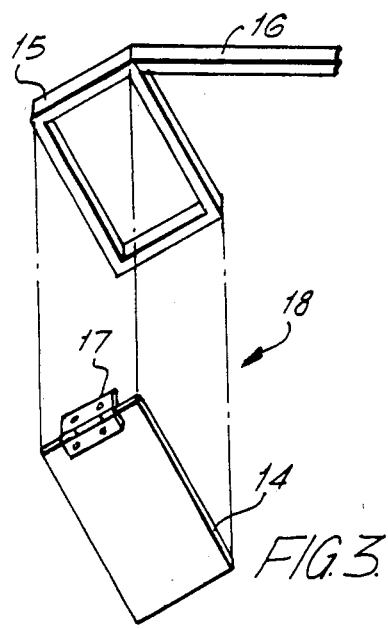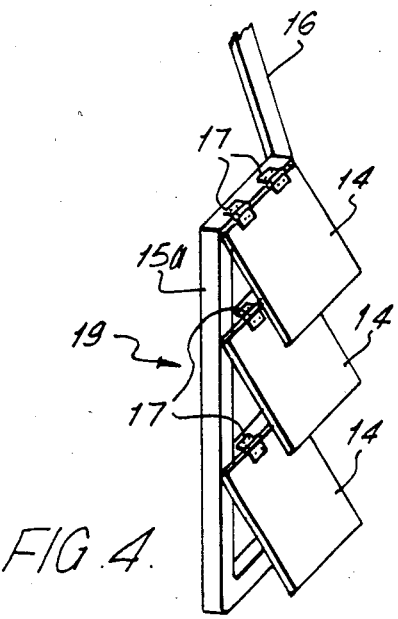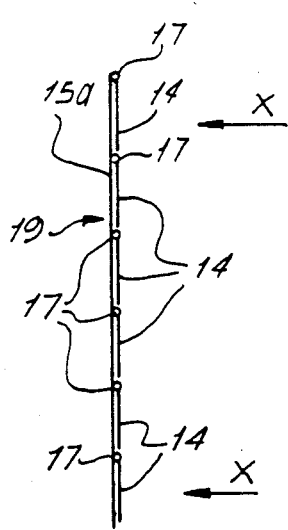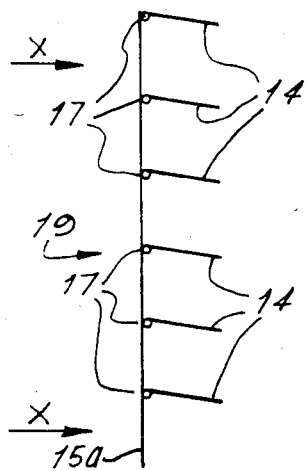

WINDMILL

The present application relates to windmills and in particular vertical-axis windmills.

BACKGROUND OF THE INVENTION

A horizontal axis windmill has the disadvantage that the vane assembly needs to be oriented into the wind and thus in an area subject to gusting and changing wind direction, the need to reorient the vane assembly to accommodate a change in wind direction will result in lost output. However, a vertical axis windmill does not need to have its vane assembly oriented into the wind and will respond to wind pressure regardless of wind direction.

Various vertical-axis windmills are known such as the Savonius which has a low efficiency and the Darious which has the disadvantage of not being a self-starting windmill. In the Panemone vertical-axis windmill, a number of paddles are hinged in a vertical direction to lever arms which in turn are free to move in a horizontal plane around a vertical axial rod. The paddles are hinged to the lever arms in such a manner that if the wind blows in one direction, each lifts against the wind presenting only its edge to the wind. If, however, the wind blows in the opposite direction, the paddle remains in a vertical position and the paddle moves in a horizontal plane under the force of the wind. Thus, for half a revolution, each paddle is being raised until only its edge is presented to the wind and for the other half of the revolution, each paddle falls until its full surface is presented to the wind. The advantage of this windmill is that it will respond to all wind directions but it rotates only at a low speed.

The invention aims to provide a vertical axis windmill which will rotate at a higher speed and/or give more driving force for the same wind speed.

SUMMARY OF THE INVENTION

According to the invention, there is provided a vertical axis windmill comprising a plurality of horizontal arms mounted for rotation in a substantially horizontal plane about an upright central axis, each arm having hinged at its free end a downwardly depending blade, each of the blades being mounted at an angle of pitch to the respective end of the arm of from 20° to 80° and also being mounted at an angle of tilt to the end of the arm of from 5° to 30°.

The term "angle of pitch" as used herein means that the blade is mounted on the end of the arm at an angle in the vertical plane to the arm.

The term "angle of tilt" as used herein means that the blade is mounted on the end of the arm at an angle in the horizontal plane to the arm.

For ease of reference, that side of the hinged blade which lifts or opens as a result of the pressure of the wind will be referred to herein as the front and that side of the hinged blade which closes as a result of the pressure of the wind will be referred to herein as the rear.

When an arm points to the direction of the wind, the wind strikes the front of the associated blade at a pitch angle according to the angle the blade makes to the arm and the lift or driving force of the wind on the blade causes the windmill to rotate.

When the wind strikes the rear of the blade and the wind pressure on the rear of the blade is greater than on the front of the blade, the blade will open up to present only its edge to the wind. When the windmill rotates at a speed of from 60 to 150 RPM even though the direction the wind blows is from the front, the pressure on the rear of the blade is greater and the blade will open e.g. under centrifugal force.

The longer the blade vertically the greater the rotational force imparted to the windmill and the greater the power it will deliver. However, if a single long blade is used, the speed of opening and closing will be slower and the impact on closing will be heavier. Thus, preferably, each blade consists of a frame provided with one or more paddles hinged thereto, but if the paddles are too small, the collective area of the edges in the open position will set up friction which will reduce the efficiency of the windmill.

BRIEF DESCRIPTION OF THE DRAWINGS

The present invention is further illustrated in the accompanying drawings, in which:

FIG. 3 is an exploded view of a blade used in the windmill shown in FIG. 1;

FIG. 4 is a perspective view of a modified embodiment of a blade for use in the windmill of FIG. 1;

FIGS. 5 and 6 are side views of a blade similar to FIG. 4 showing the effect of wind direction.

DESCRIPTION OF THE PREFERRED EMBODIMENT

Figure 1:
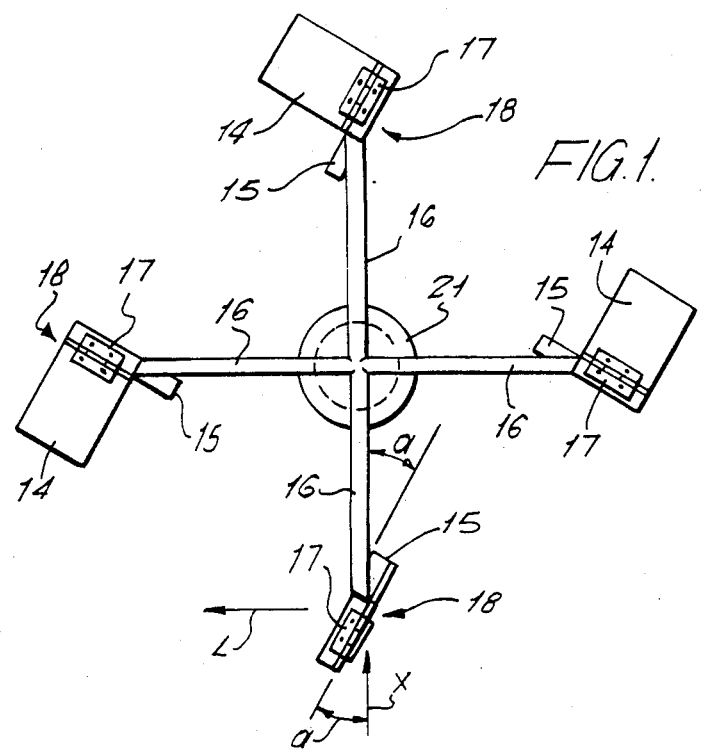
FIG. 1 is a view from above of a windmill in accordance with the present invention.
Figure 2:
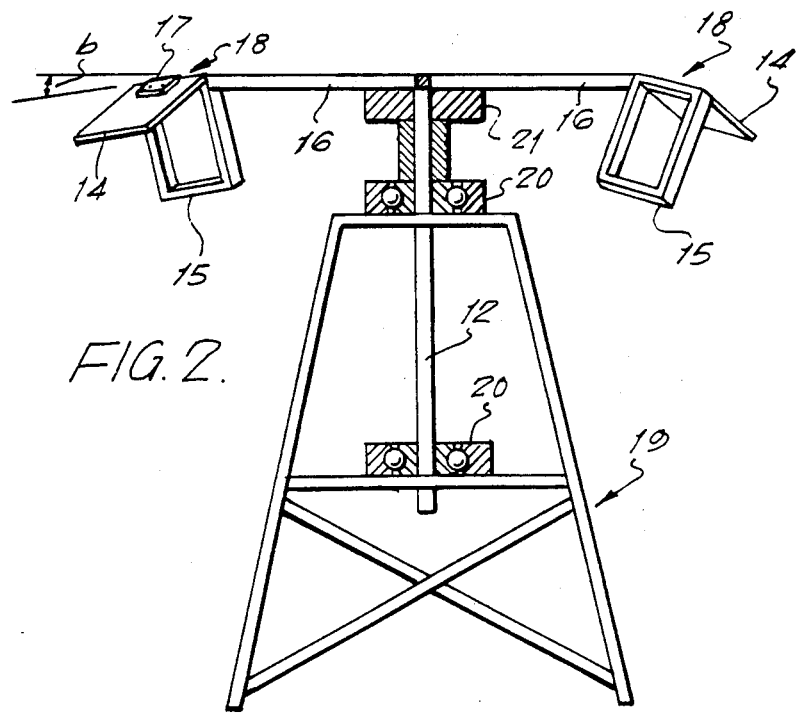
FIG. 2 is a side view of the windmill shown in FIG. 1.

As shown in FIGS. 1 and 2, a windmill in accordance with the present invention comprises a tower 19 on which is mounted, by means of bearings 20, about a vertical axis a rotatable shaft 12. The rotatable shaft 12 carries a centre plate 21 to which are connected four radially extending arms or rods 16. At the end of each rod 16 is mounted a blade 18 comprising a frame 15 to which a paddle 14 is hinged by means of hinges 17.

Each blade 18 is so mounted that it makes an angle "a" to its respective rod 16 in the horizontal plane. Angle "a" is defined herein as the angle of pitch of the blade.

Each blade 18 makes an angle of tilt "b" to its respective rod 16 in the vertical plane. The provision of the blade at angle "b" ensures that the paddle 14 exposes a small surfacw area to the wind when the angle or pitch of the blade to the direction of the wind is zero. The resultant low wind pressure on the paddle 14 causes it to close onto the frame 15. Preferably, angle "b" is approximately 10°. If angle "b" is made too large, it will cause a big bump or slam when the paddle closes onto the frame.

As shown in FIG. 1, arrow X indicates the direction of the wind and the windmill will rotate in a clockwise direction in the sense seen in FIG. 1. The paddle on the rod which is pointing to the direction of the wind is pressed against its frame because the wind pressure is on the front of the blade. The wind blows onto the blade at an angle of pitch "a" and lift or driving force "L" on this blade causes the windmill to rotate whereas in the case of the other blades, the paddles are lifted or opened because the air pressure on the rear of the blade is greater than the air pressure on the front.

FIG. 3 is an exploded view of the blade 18 used in the windmill shown in FIGS. 1 and 2. The blade 18 comprises a frame 15 to which is hinged the paddle 14 by means of the hinges 17. Paddle 14 is made of a rigid, thin and light material such as aluminum sheet, synthetic plastics material, fibreglass or other fabric.

FIG. 4 shows a modified embodiment of blade 19 in which three paddles 14 are hinged by means of hinges 17 to a single frame 15a.

FIGS. 5 and 6 show side views of a blade 19 similar to that shown in FIG. 4 except that there are six hinged paddles 14. In FIG. 5, the wind is shown blowing in the direction of the arrow X against the front of the blade 18 and the paddles 14 remain closed to the frame 15 so giving a driving force to rotate the windmill. In FIG. 6, the wind is blowing in the direction of the arrow X against the rear of the blade 18 and so the paddles 14 are lifted from the frame 15 and there is no force to drive the windmill in the desired direction of rotation.

Figure 7:
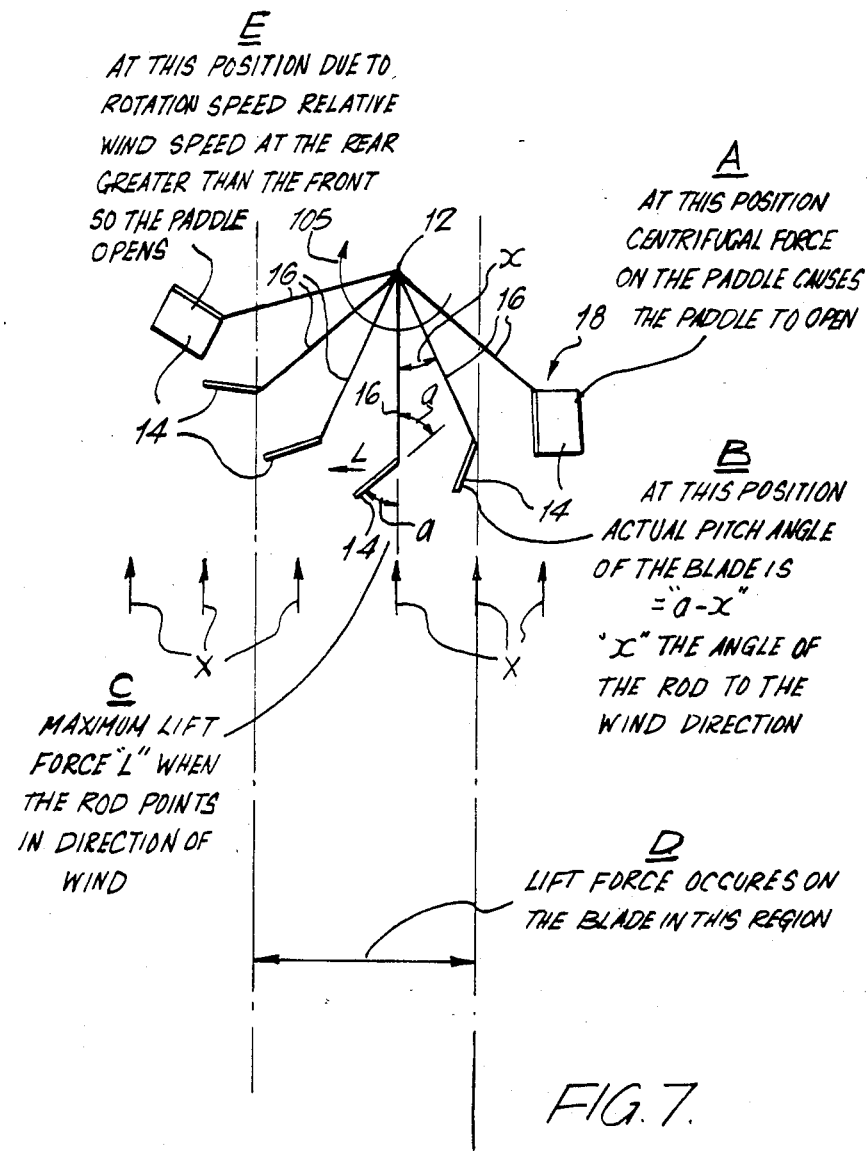
FIG. 7 shows the principle of operation of the windmill of FIG. 1.

The principle of operation of the windmill of the present invention is as follows. Referring to FIG. 7, the blade 18 is hinged to the horizontally orientated rod 16 which can rotate around axis 12 in the direction of arrow 105.

At the point marked "A" in FIG. 7, the angle made by rod 16 to the direction of the wind is quite large but the centrifugal force of the rotating windmill on the paddle 14 causes it to open. At the point marked "B" the angle the rod 16 makes to the direction of the wind is smaller and the actual angle of pitch of the blade is "a-x", wherein x is the angle of the rod to the wind direction X. At the point marked "C" in FIG. 7, the rod 16 is lying in the same direction as the direction of the prevailing wind and the paddle 14 experiences maximum lift or driving. The area marked "D" in FIG. 7 is the area in which the paddle 14 experiences lift driving force due to the wind pressure. At the point marked "E" in FIG. 7 due to the speed of rotation of the windmill the relative wind speed on the rear of the blade is greater than on the front and so again the paddle opens.

I claim:

1. A vertical axis windmill comprising:
   an upright central axis;
   a plurality of horizontal arms mounted for rotation in a substantially horizontal plane about said upright central axis;
   a plurality of frames, each frame being substantially vertical and coupled to a free end of one of said arms, each of said frames having an uppermost section extending downwardly from one of said arms at a tilt angle of from 20° to 80° from said arm and extending forwardly from said arm in the direction of rotation of said arm at a pitch angle in the same plane as said arm of from 5° to 30° from said arm; and
   a plurality of blades, each blade being hinged at an edge thereof to said uppermost section of one of said frames, each blade being shaped so that upon rotation about said hinged edge said blade will contact said frame in said substantially vertical position thereby preventing further rotation of said blade.

2. A vertical axis windmill according to claim 1, in which said angle of tilt is 10°.

3. A vertical axis windmill according to claim 1, in which each said blade consists of at least one paddle hinged to at least one frame.

4. A vertical axis windmill according to claim 3, in which a plurality of paddles are hinged to a single frame.

5. A vertical axis windmill according to claim 3, in which said paddle is made of one of aluminum sheet, synthetic plastic material or fibreglass.

6. A vertical axis windmill according to claim 1, wherein said frame is shaped complementary to the perimeter of said blade.

7. A vertical axis windmill according to claim 6 wherein said frame and said blade are rectangular.

8. A vertical axis windmill comprising:
   an upright central axis;
   a plurality of horizontal arms mounted to said central axis for rotation in a substantially horizontal plane about said upright central axis;
   a plurality of rectangular frames, each frame being coupled to a free end of one of said arms and being disposed in a substantially vertical plane, each of said frames having an uppermost section extending downwardly from one of said arms at a tilt angle of from 20° to 80° from said arm and extending forwardly from said arm in the direction of rotation of said arm at a pitch angle of from 5° to 30° from said arm, each said frame defining a rectangular opening; and
   a plurality of rectangular blades, each blade being hinged at an edge thereof to said uppermost section of one of said frames on a side thereof opposite said direction of rotation, each blade being further shaped to overlie said rectangular opening of the associated frame when the blade is in a substantially vertical position;
   whereby wind acting on the windmill causes each blade to move into said substantially vertical position during a first power phase of rotation of the windmill and towards a substantially horizontal position during a second phase of rotation allowing the wind to pass through said frame opening.

* * * * *